R. T. SUTTON.
Grain Drier.
No. 41,947.
Patented March 15, 1864.
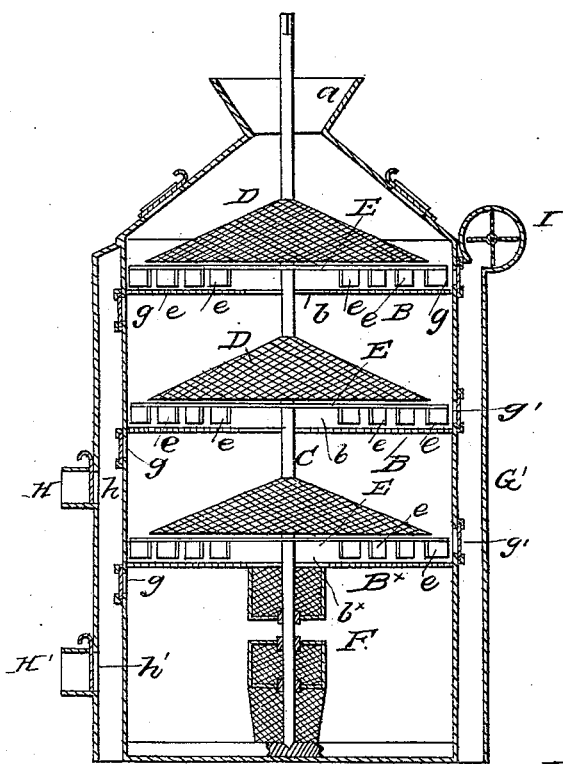
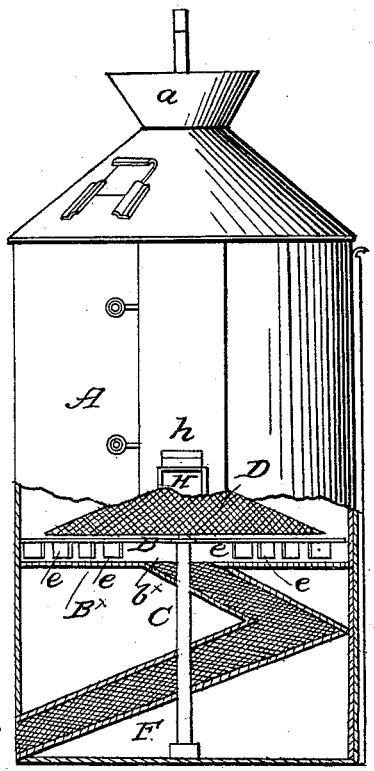
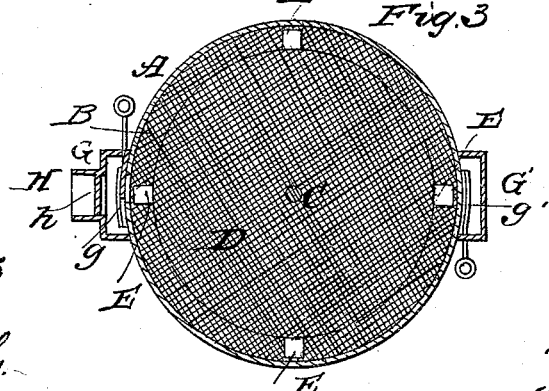

UNITED STATES PATENT OFFICE.

R. T. SUTTON, OF ROCHESTER, NEW YORK.

IMPROVEMENT IN GRAIN-DRIERS.

Specification forming part of Letters Patent No. 41,947, dated March 15, 1864.

*To all whom it may concern:*

Be it known that I, R. T. SUTTON, of Rochester, in the county of Monroe and State of New York, have invented a new and Improved Grain-Drier and Cooler; and I do hereby declare that the following is a full, clear, and exact description of the same, reference being had to the accompanying drawings, forming a part of this specification, in which—

Figure 1 represents a vertical section of my invention. Fig. 2 is a sectional elevation of the same. Fig. 3 is a horizontal section of the same.

Similar letters of reference in the three views indicate corresponding parts.

This invention consists of a series of perforated cones arranged in the interior of a tower or suitable shell, and applied, in combination with a series of conveyers, perforated platforms with chambers for receiving and for discharging hot and cold air, and one or more suction-blowers in such a manner that grain introduced through a suitable spout or hopper in the upper part of the tower will be scattered successively over the cones and spread by their action combined with that of the conveyers or the platforms, and finally discharged through a perforated chute, being exposed throughout its whole course to a current of hot or cold air, which can be regulated by suitable dampers, or simultaneously to a current of hot and of cold air, and by the action of the suction-blower the moisture is expelled with the spent air, while the grain is cooled by the cold air.

To enable those skilled in the art to make and use my invention, I will proceed to describe it.

A represents a shell or tower made of brick, metal, or any other suitable material, and provided at its top with a spout or hopper, $a$, through which the grain can be introduced.

The interior of the tower is provided in two or more stories by a series of horizontal platforms or floors, B B*, made of perforated sheet metal, and a shaft, C, extends from the lower floor up through the top of the tower. Secured to this shaft are a series of cones, D, made of perforated sheet metal or wire-gauze, and a series of arms, E, carrying oblique blades or conveyers $e$, which sweep close over the platforms B. The grain, on being introduced through the hopper $a$, drops on the first cone D, where it is scattered and conducted to the circumference of the upper floor. By the action of the conveyer it is spread on this floor and carried to its center, where it drops down through the central aperture, $b$, on the second cone, &c., until it arrives on the lowest floor, B*. The central opening, $b*$, of this floor communicates with the chute F, which is made of perforated sheet metal, and extends in a zigzag line to the discharge-opening.

G G' are two chambers extending from the bottom to the top of the tower A, and on opposite sides of the same, as clearly shown in Fig. 1 of the drawings. The chamber G communicates with the interior of the tower through apertures $g$, which can be closed by suitable slides, and said apertures are situated close under the floors B B*, and it is supplied with hot or cold air conducted to it through pipes H H', which are furnished with dampers or slides $h\ h'$, so that they can be opened or closed at pleasure. The chamber G' communicates with the interior of the tower through apertures $g'$, which can be closed by suitable slides, and which are situated close over the several floors B B*, so that the air passing in through the apertures $g$ from the chamber G has to pass through the perforated floors and through the grain spread thereon before it is allowed to escape through the apertures $g'$. A suction-blower, I, which is situated on the top of the chamber G' serves to discharge the spent air and the vapor rising from the grain.

By the arrangement of the supply-pipes H H' and the apertures $g\ g'$, on opposite sides of the floors B B* the grain, while spread on the third and second floors, can be exposed to a current of hot air, and when it arrives on the lowest or first floor, B*, it may be exposed to a current of cold air, so that it will be dried while passing over the upper floors and cooled while passing over the lowest floor and through the perforated chute F.

If desired, the current of hot or cold air may be introduced in the tower A directly from its bottom, and discharged through suitable apertures in its top; but in this case the operations of desiccating the grain and of cooling the same cannot be executed simultaneously.

What I claim as new, and desire to secure by Letters Patent, is—

The revolving perforated cones D, conveyers F, and perforated floors B B*, in combination with the tower A, air-supply chamber G, with inlet and outlet openings H H', and air-discharge chamber G', with openings g', and suction-blower I, constructed and operating in the manner and for the purpose substantially as shown and described.

R. T. SUTTON.

Witnesses:
J. C. O'BRIEN,
E. B. WHEELER.